United States Patent [19]

O'Neal

[11] 4,025,040

[45] * May 24, 1977

[54] VOTING MACHINE WITH PUNCH CARD ATTACHMENT

[75] Inventor: Cothburn M. O'Neal, Arlington, Tex.

[73] Assignee: Riverside Press, Inc., Tex.

[ * ] Notice: The portion of the term of this patent subsequent to Dec. 28, 1988, has been disclaimed.

[22] Filed: July 22, 1974

[21] Appl. No.: 490,555

Related U.S. Application Data

[60] Division of Ser. No. 199,069, Nov. 15, 1971, Pat. No. 3,846,718, which is a continuation of Ser. No. 35,671, May 8, 1970, Pat. No. 3,630,434, which is a division of Ser. No. 740,415, May 27, 1968, Pat. No. 3,524,969.

[52] U.S. Cl. .................................. 234/1; 234/84; 234/116

[51] Int. Cl.² ........................................ G06K 1/08

[58] Field of Search .................... 234/116, 1-3, 234/69, 84-87, 122

[56] References Cited

UNITED STATES PATENTS

| | | | |
|---|---|---|---|
| 650,340 | 5/1900 | Royle | 234/84 X |
| 698,450 | 4/1902 | Capper | 234/84 X |
| 1,015,619 | 1/1912 | Fleming | 234/84 X |
| 1,161,368 | 11/1915 | Wyman | 234/84 X |
| 1,945,794 | 2/1934 | Werk, Jr. | 234/116 X |
| 2,397,112 | 3/1946 | Hueber | 234/116 X |
| 2,555,750 | 6/1951 | Luhn | 234/116 X |
| 3,128,943 | 4/1964 | Stewart | 234/116 X |
| 3,510,056 | 5/1970 | East et al. | 234/116 X |

*Primary Examiner*—Frank T. Yost
*Attorney, Agent, or Firm*—Hubbard, Thurman, Turner & Tucker

[57] ABSTRACT

A compact, lightweight, manually operated voting machine with provisions for straight ticket, selective and write-in voting, and for choosing two or more candidates from a list of several running at large; with provision for recording each voter's choice on a punch card for computer counting, and including a mechanical counter automatically totalling the votes for each candidate for confirmation of the punch card count.

9 Claims, 22 Drawing Figures

VOTING MACHINE WITH PUNCH CARD ATTACHMENT

This is a division of copending application Ser. No. 199,069, filed Nov. 15, 1971, now U.S. Pat. No. 3,846,718, which is a continuation application of prior application Ser. No. 035,671, filed on May 8, 1970, now U.S. Pat. No. 3,630,434, which in turn is a division of prior application Ser. No. 740,415, filed May 27, 1968, now U.S. Pat. No. 3,524,969.

This invention relates to voting machines and is directed to improvements in the construction illustrated and described in my prior U.S. Pat. No. 3,168,240 which was issued on Feb. 2, 1965. This application is a division of my copending application, Ser. No. 740,415, filed May 27, 1968.

My prior invention accomplished the object of listing candidates for more than one office in a single column, thus substantially reducing the weight and bulk in comparison to existing voting machines. It also employed a very compact selector mechanism, whereby but one vote out of each slate of candidates is allowed, which helped to provide a relatively small and economical machine. My present invention further simplifies this selector mechanism by using standard steel balls instead of specially designed plunges which substantially reduce the cost of manufacture.

Another object of the invention is to improve the layout of the machine from the standpoint of reading and operation.

Another object of the invention is to provide a voting machine which records each vote on a punch card for later computer counting and which also records every vote for each candidate on a mechanical counter which cannot be read until the machine is unlocked after the election.

Another object of the invention is to provide means whereby a stated number of candidates can be selected from a larger list, for example, as in a city council election, where there are to be only three candidates elected out of a slate of ten.

These and other objects will become apparent from the following description and the accompanying drawings, in which.

Figure 1:
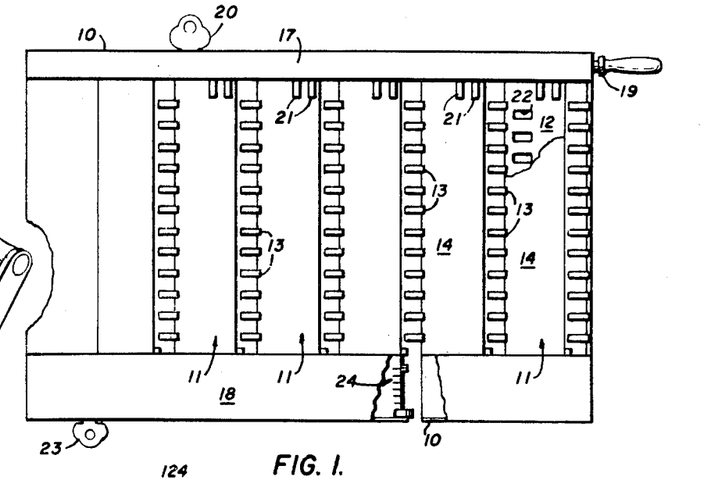
FIG. 1 is a partly cut away plan view of one configuration of the machine.
Figures 2, 20:
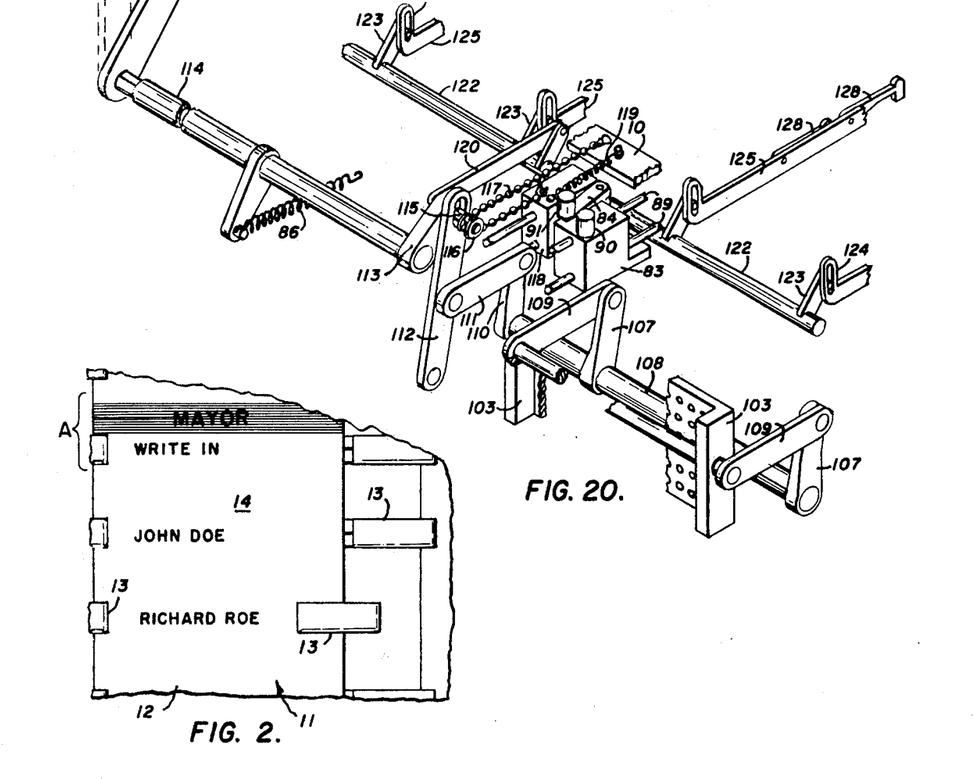
FIG. 2 is a fragmentary enlarged plan view showing the relation of the candidate names and the voting keys.
FIG. 20 is an isometric view of the voting lever and the linkages connected thereto.

Referring now to FIGS. 1 and 2, when fully assembled, the voting machine consists of several identical columnar units included in a frame 10, and each columnar unit 11 comprising a body 12, voting keys 13, and a cover card 14 on which are taped or printed the various offices and the candidates' names. A cover plate 15 along the left side of the machine conceals the card pushing mechanism hereinafter numbered and described, leaving a slot 16 for the insertion of the card. Additional cover plates 17 along the top of the machine and 18 along the bottom serve to make the mechanism inaccessible to tamperers and to hold the machine together.

A voting lever 19 at the upper right hand corner of the machine is pulled toward the operator to register his vote. A re-setting key 20 is retained by an official at the voting booth and used to release the mechanism after each vote is recorded, preparing the machine for the next voter.

The paired voting keys 21 along the top of the machine are for straight ticket voting as hereinafter described. The body 12 of each voting unit 11 contains apertures 22 through which mechanical counters, hereinafter described and numbered, can be read by removing the cover cards 14 when the machine is unlocked after the polls are closed. A key 23 fitting a standard tumbler lock (not shown) gives access to the inside of the machine and is retained by a qualified official at election headquarters. The candidate-at-large selector mechanism index 24 is concealed by the lower cover plate 18 and must be adjusted at headquarters for each election when the machines are assembled, as hereinafter described.

Figure 3:
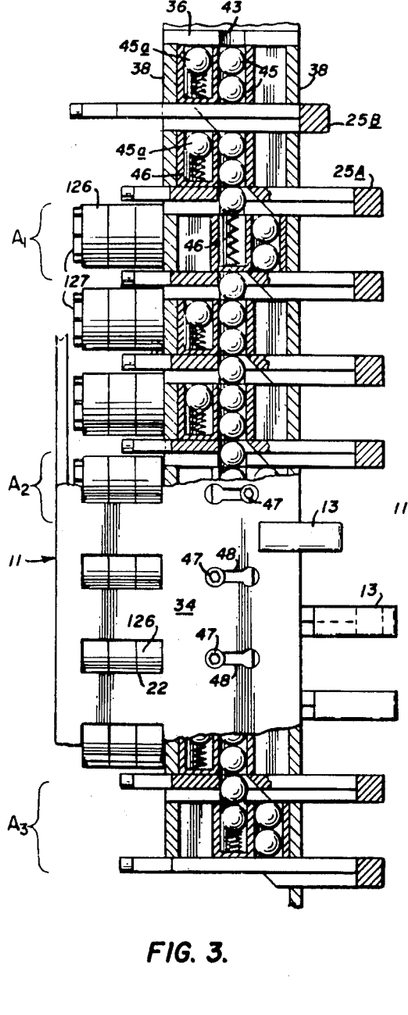
FIG. 3 is a cut away plan view of a portion of the selector mechanism sectioned at various levels.
Figure 4:
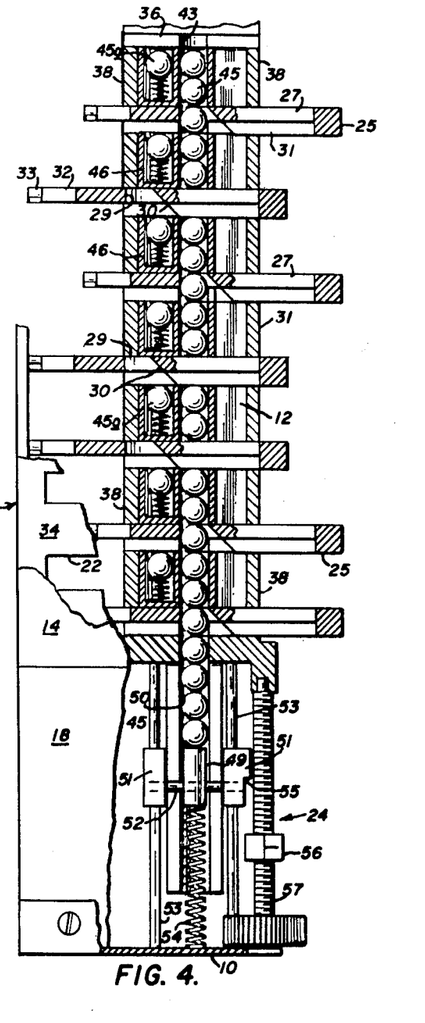
FIG. 4 is a similar view of a different portion of the selector mechanism.
Figures 5, 6, 7, 8, 9, 10:
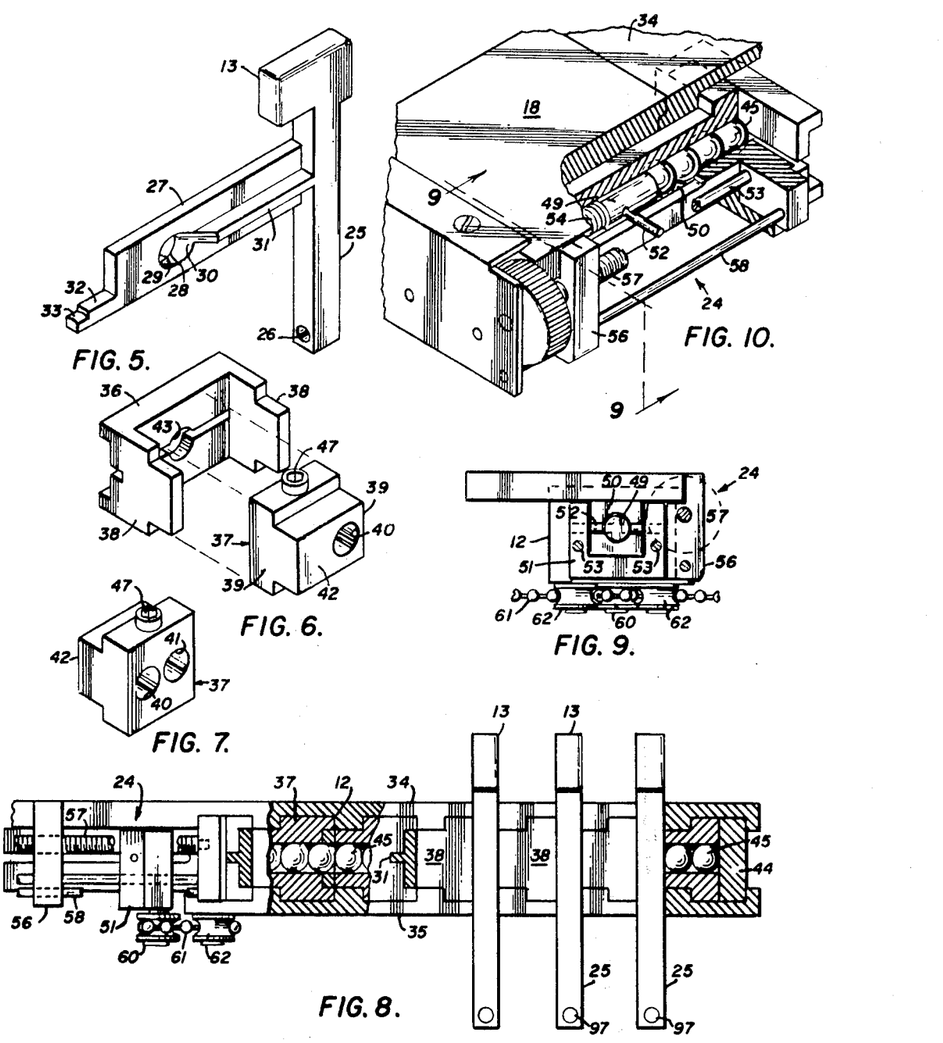
FIG. 5 is an isometric view of a single voting key.
FIG. 6 is an isometric exploded view of two interlocking components of the selector mechanism.
FIG. 7 is a reversed isometric view of one of the components shown in FIG. 6.
FIG. 8 is a side elevational, partly sectioned view of a portion of the selector mechanism.
FIG. 9 is a cross sectional view of the selector mechanism taken along line 9—9 on FIG. 10.
FIG. 10 is a cut away isometric view of a portion of the selector mechanism concerned with voting for candidates at large.

Referring now to FIGS. 3 to 8, inclusive, selector mechanism comprises, in multiple, the aforementioned voting key 13 shown complete in FIG. 5 and having a vertical post 25 with a socket 26 at its lower end. A slide 27 extends horizontally from the post 25 and contains a hole 28 accurately machined so that the periphery on the far side is circular and the wall 29 of the hole opposite the post 25 is cylindrical and perpendicular to the plane of the slide 27. The wall 30 of the hole toward the post 25 is cylindrical at a 45° angle to the place of the slide 27. The thickness of the slide 27 is one-half the thickness of the post 35 and a flange 31 equal to the other half of the thickness of the post 25 extends from the post 25 to the hole 28, ending coincident with the diagonal cylindrical surface 30. The diameter of the hole 28 where it is circular on the far face of the slide 27 is equal to the combined thickness of the slide 27 and the flange 31. A finger 32 having a cam surface 33 extends beyond the end of the slide 27 for the purpose of operating a mechanical counter as hereinafter described.

The body 12 of the voting mechanism comprises a pair of notched plates 34 and 35, respectively, and a series of identical pairs of interlocing blocks 36 and 37, respectively, which fit into the opposing notches of the plates 34 and 35. As detailed in FIGS. 6 and 7, the larger block 86 partly surrounds the smaller block 37 and is U-shaped with legs 38 which, in outline, match the outlines of the end faces 39 of the smaller blocks 37. Two horizontally separated and parallel holes 40 and 41 having their centers parallel to the length of the body 12 are located on the vertical center of the smaller blocks 37. The hole 40 extends through each block 37 while the hole 41 is blocked off near the surface 42 to form a socket. The diameters of the holes 40 and 41 fit the diameter of the hole 28 in the slide 27. The space between the legs 38 on the larger block 37 is equal to the length of the smaller block 37 plus the distance between the centers of the holes 40 and 41.

The back of each larger block 36 is provided with a hole 43 of the same diameter and which will align with either of the holes 41 or 42 when the smaller block 37 is resting aganist one or the other of the legs 38. The back of the larger block 36 is slotted horizontally to accept the flange 31 of the slide 27 of the key 13. The blocks 36 and 37 and the key slide 27, when nested, make an assembly three times as thick as the diameter of the hole 40, as is clearly shown in FIGS. 3 and 4. As shown in FIG. 8 the assemblies are stacked one adjacent the other in any convenient number by fitting the same into the matching notches of the plates 34 and 35. A blank 44, with the outer shape of the larger block 36, but without a hole or slot, is provided to end the series as shown in FIG. 8.

When the aligning holes in the parts forming the body 12 are filled with identical steel balls 45, there is a pattern as disclosed in FIGS. 3 and 4. Each socket 41 in the smaller block 37 contains one ball 45a supported by a helical spring 46 which forces it aganist the larger block 36. The balls in the holes 40 in the smaller block 37 and the holes 28 in the slides 27 make a continuous column for all the candidates for one office. The candidates are separated by moving one of the smaller blocks 37 to the right where the hole 41 lines up with the hole 43 in the larger block 36. The head of a set screw 47 in the top of each smaller block 37 fits into either end of a dumbbell shaped slot 48 in the upper notched plate 34. The blocks 37 at positions $A_1$, $A_2$ and $A_3$ in FIG. 3 have been set to start a column of candidates for a different office. To accomplish this the set screw 47 is loosened to where it can be moved in the slot 48 then the key 25A in that block assembly is pushed to the left like the key 25B (shown for convenience just above) forcing the whole series of balls 45 downward so that the ball is eliminated from the hole in the slide 27 of the key involved. Then the block 37 is moved to the right and secured by the set screw 47. When the key 25A is returned to its right hand position the ball 45a centers the hole 28 in the slide 27, as shown at position A. Key 25B, as shown, should be considered only as an illustration of what happens when key 25A is pushed to the left to set the block 37. If it has been voted, the balls would be in a position indicated at $A_3$. For the purpose of this description consider that the candidate above $A_1$ has not been voted. No candidate in $A_1$–$A_2$ has been voted and one candidate in $A_2$–$A_3$ has been voted. When any key in a series is pushed to the left the ball 45 in the hole 28 in the slide 27 forces the column of balls downward, the last one 45a entering the socket 41 of the block 37 set at the bottom of the column. The spring 46 will not allow the ball 45a to drop more than one diameter into the socket 41 so it is impossible for more than one ball to be displaced, hence one key can be moved; and only one candidate can be voted in each series.

If it is desired to vote more than one candidate out of a series, as for example, a city council, the set-up illustrated in FIG. 4 is used. The blocks 37 are all in the right hand position so that there is a continuous column of balls free to move downward against a spring supported stop 49 slidably installed in a tubular receiver 50 the size of the balls 45. A U-shaped block 51 is attached to the stop 49 by means of a pin 52 and operates smoothly on guide rods 53. The compression spring 54 supporting the stop 49 is relatively long and limber allowing a substantial travel of the stop 49. Each time a key 13 is moved to the left (starting at the top of the column and working down) to vote a candidate, the column of balls 45 is moved downward displacing the stop 49 to diameter of one ball. A shoulder 55 on the extension 52 will eventually come to rest against an indexing block 56 held by an adjusting screw 57 stabilized by a slide rod 58 and turned by a thumb screw wheel 59. When the machine is set up for voting the indexing block is set for a certain number of allowed selections out of the list of candidates on that column, as shown in the cutaway portion at the bottom of FIG. 1. In FIG. 4 three candidates in the series have been voted and there is room for two more. The parts described above belong to the candidate-at-large selector mechanism 24 mentioned early in the description and further described below.

It might be that there are more candidates-at-large than can be listed on one column, or that more can be voted out of that list than can be accomodated by the receiver 50. Thus it becomes necessary to list the candidates in two or more adjoining columns that are mechanically interacting. Referring now to FIGS. 8, 9, 10 and 10A, it will be seen that the bottom of the U-shaped block 51 carries a sheave 60 around which runs a chain 61 which is threaded over paired sheaves 62 attached to the body 12. This configuration is repeated on each column aand the ends of the chain are fixed (by means not shown) so that if the U-block 51 on any one column is pushed back one ball diameter, taking up the chain, it limits the available travel space of the U-block 51 on the adjoining column by one ball diameter. For example, if there are eight candidates to be voted out of a slate of 30 and the receiver will accept only six balls, then 20 candidates can be listed on one column and 10 on the adjoining column. If all eight candidates voted should be in one column, two of them would have to be transferred automatically to the receiver of the other column as above described.

Figure 10A:
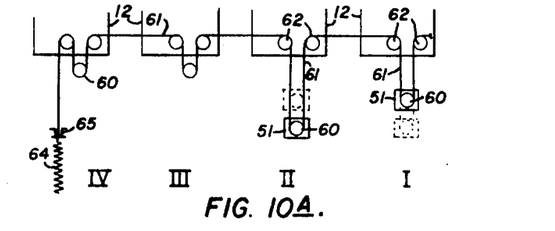
FIG. 10A is a diagram representing the function of part of the candidates at large mechanism.
Figures 11, 12, 13, 14, 18, 21:
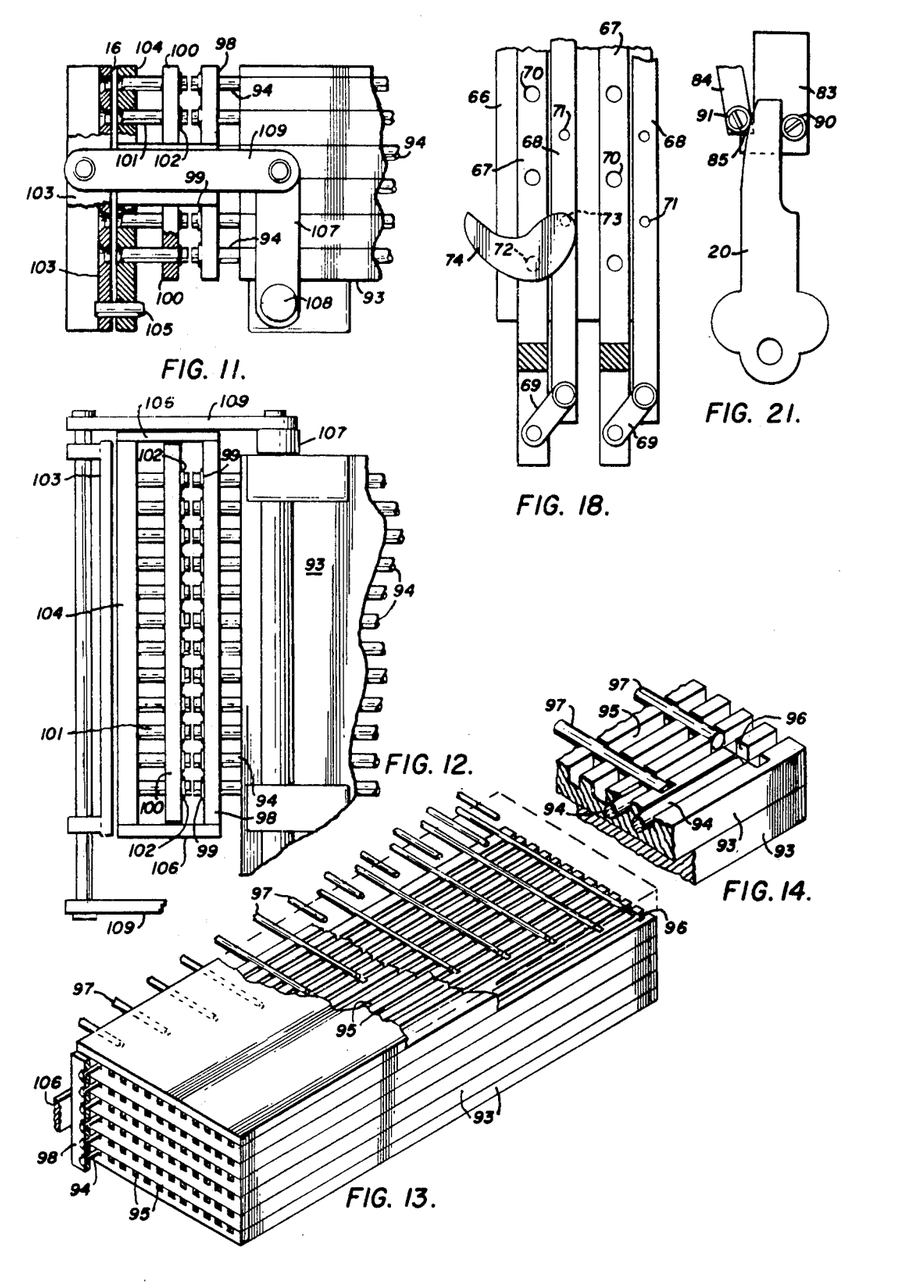
FIG. 11 is a fragmentary cut away elevational view of the card punch mechanism.
FIG. 12 is a fragmentary bottom view of the part shown in FIG. 11.
FIG. 13 is an isometric cut away view of the punch push rod bank.
FIG. 14 is an isometric fragmentary detail of a portion taken from FIG. 13.
FIG. 18 is a plan view of a part of the lower end of the straight ticket operating mechanism.
FIG. 21 is a plan view of the resetting key including parts of the components it operates.

The last referred to action is shown diagrammatically in FIG. 10A in which one end of the chain 61 is fixed at the point 63 on the first body 12 and the other end of the chain is held taut by a spring 61 but is prevented by an adjustable stop 65 from extending to include more than the allowed number of elected candidates. Thus, if out of eight candidates five are voted on of column II, only three more can be voted out of column I, as shown by solid lines. But if only three are voted out of column II, as shown by dotted lines, then five can be voted out of column I.

Figures 15, 19:
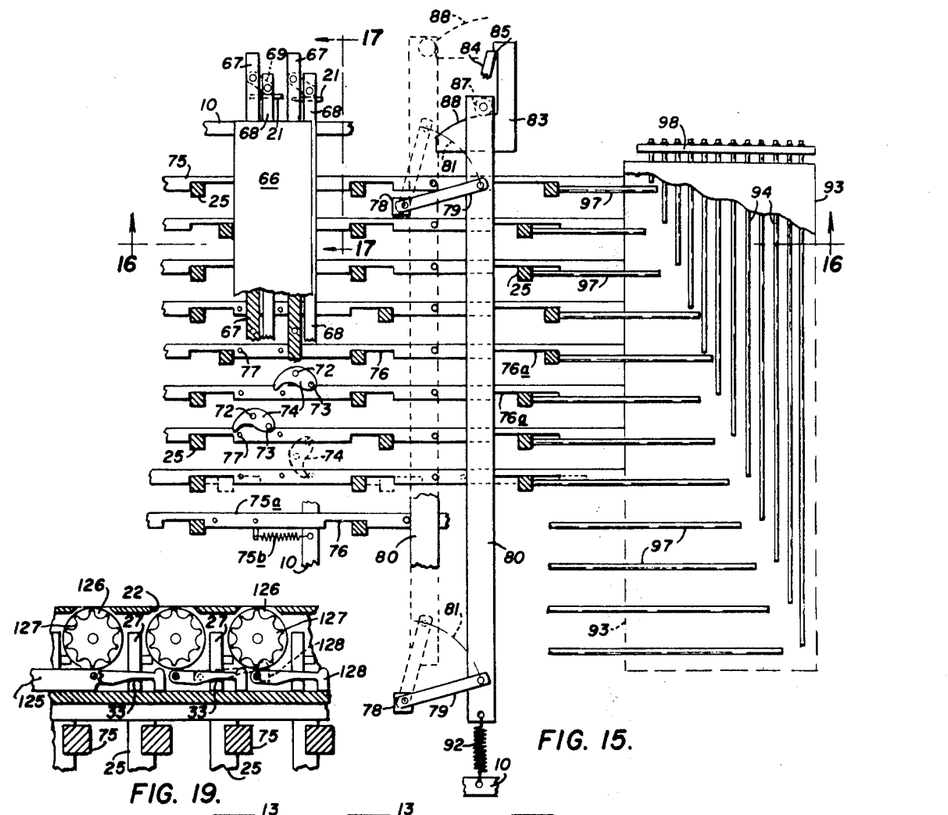
FIG. 15 is an inverted plan view in part of the elements involved in selection, straight ticket voting and resetting the machine.
FIG. 19 is a side elevational view of a part of the mechanical counter operating mechanism.
Figure 16:
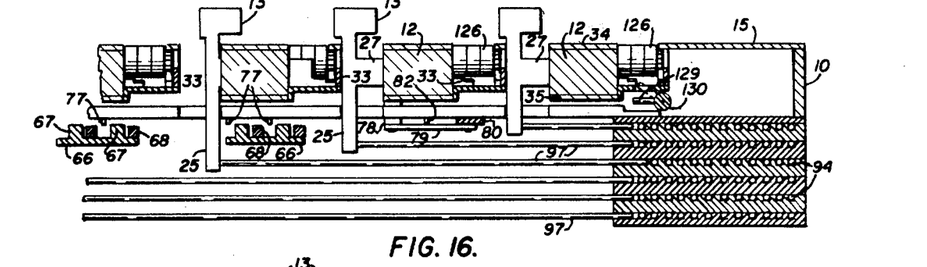
FIG. 16 is a cross sectional view taken along line 16—16 of FIG. 15.
Figure 17:
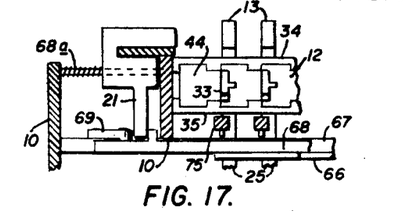
FIG. 17 is a fragmentary sectional view taken at the top of the machine showing a straight ticket key in elevation.

The straight ticket voting mechanism, detailed in FIGS. 15, 16, 17 and 18, consists of an elongate bottom plate 66 attached directly under all but the last two bodies 12 as shown in FIG. 16. Two parallel bars 67 are integral with the elongate plate 66, and two slightly smaller bars 68 lie alongside of the bars 67 and are attached thereto by toggles 69. The bars 68 are linked to the straight ticket keys 21 as shown in FIG. 17 and are held in the down position illustrated by springs 68a. The bars 67 and 68 are supplied with holes 70 and 71, respectively, one each for every voting unit in the body 12 and which are designed to receive pins 72 and 73, respectively, on cams 74 which can be lifted out and placed in any pair of holes corresponding to any voting unit. A cam is placed on one pair of bars 67 and 68 under each Democratic candidate listed on the column and on the other pair of bars 67 and 68 under each Republican candidate listed on the column. When the Republican key 21 is forced upward, all the cams 74 on that pair of bars will swing to the position shown dotted in FIG. 15, voting all the Republican candidates in that column as further explained below. Since one Republican candidate in each series has now been voted, it is impossible to move the Democratic key 1, as this would tend to cause an additional voting key 13 to move in each series, which would be impossible, The cams 74 in the straight ticket voting mechanism interact with a series of transverse slide bars 75 which are notched where they intersect the key posts 25, each notch 76 being of sufficient length to allow the key post 25 to travel the full length of the voting stroke without displacing the slide bar 75. Depending pins 77 on the slide bars 75 are the means whereby the cams 74 move the slide bars 75 and each slide bar, when moved by its corresponding cam 74, in turn moves its corresponding voting key 13 by bearing against the key post 35. In the machine herein illustrated the last column is devoted to constitutional amendments or other propositions requiring yes or no vote, so the notches 76a for this column on the slide bars 75 are long enough so that the keys in this column are not affected by the cam action in a straight party vote.

A re-setting unit comprises two stationary anchors 78 for a pair of toggles 79 which extend to a rigid bar 80 which lies just under and perpendicular to the slide bars 75, and which, when forced to follow the swinging are 81 of the toggles 79, will bear against the depending pins 82 forcing all the slide bars 78 back to their original positions and re-setting all the voting keys 13 by means of the notches 76 and the key posts 25. In FIG. 15 the slide bar 75a only is shown in the extreme right hand position required to reset the key posts 25. Light tension springs 75b anchored to the frame 10 attached to all the slide bars, but shown only once, return the bars to the ready position described above. The reset bar 80 is powered by a pressure block 83 (FIGS. 15, 20 and 21) which is moved in turn by a pawl 84 engaging a hook 85 on the pressure block 83. The pawl 84 is actuated by the return spring 86 of the voting lever 19 as hereinafter described, so that every time the lever 19 is pulled and released the vote is registered and the machine is cleared. A roller 87 attached to one end of the reset bar 80 coacts with a cam face 88 on the pressure block 83 to transmit the required motion to the reset bar 80, and the block 83 is guided by slide rods 89.

After each voting operation an official inserts the reset key 20 between rollers 90 on the pressure blocks 83 and 91 on the pawl 84 forcing the latter off the hook 85, allowing the reset bar 80 to be returned to its original position by means of a spring 92, connecting the bar 80 to the frame 10. For each voter a punch card is inserted in the slot 16 at the upper left hand corner of the machine. The card punching unit is primarily illustrated in FIGS. 11 to 15, inclusive, and comprises a bank of selector plates 93, one for each voting columnar unit 11. The plates 93 are grooved longitudinally, parallel to the voting columns 12 to receive push rods 94, each progressively longer by the space required by one voting unit body 12. The longitudinal grooves 95 extend the full length of the plates 93 and are intersected by transverse grooves 96 opposite the voting unit bodies 12, each reaching progressively from just beyond the first groove 95 to just beyond the last one.

Transverse push rods 97 are attached to the sockets 26 at the lower ends of the voting key posts 25, the rod at the top of the column being the longest, and each one being shorter in a descending series so that it will block the movement of its corresponding longitudinal rod 94 when the key is voted, but will allow the rod to pass when the key is not voted. The key posts 25 are progressively longer for each voting column to align the transverse rods 97 with the respective selector plates 93.

The longitudinal push rods 94 extend through a movable perforated plate 98 at the end adjacent the card slot 16 and are locked on the far side with snap washers 99. Close to the movable plate 98 there is a matching stationary perforated plate 100 holding punches 101 axially aligned with the punch rods 94 and held in place with snap washers 102. A punch plate 103 and a guide plate 104 are held together as each side of the card slot 16 by pins 105. The movable perforated plate 98 and the guide plate 104 comprise a unit held together by side frame members 106. When the voting lever 19 is pulled towards the operator, bellcranks 107 on a jack shaft 108 (operated by a linkge described below) pull the punch plate 103 against the punches 101 by means of links 109. Only the punches 101 blocked by the push rods 94 which are in turn blocked by the transverse rods 97 attached to keys which have been voted will resist the motion of the punch plate 103 and perforate the card. The remaining punches 101 will slide through the stationary plate 10, displacing their respective push rods 94. When the lever 19 is released, the punch plate 104 returns to its original position, stripping the card off the punches 101, and the perforated plate 98 pulls the rods 94 back to their original position by means of the snap washers 99.

The jack shaft 108 (as shown in FIG. 20) is actuated by a bellcrank 110 connected by a link 111 to a lever 112 actuated in turn by a bellcrank 113 on the main shaft 114 to which is attached the voting lever 19. The length of the lever 112 and the shortness of the bellcrank 113 ads considerable mechanical advantage where it is required to punch the card if a large number of keys have been voted.

The card is printed with a space for each possible write-in in candidate, and the voter writes the name on the card and then votes the corresponding write-in key on the machine, which will punch the card to show that a write-in vote has been cast for that office. Referring again to FIG. 20, the pivot pin 115 which connects the bellcrank 113 to the lever 112 carries a sheave 116 around which runs a chain 117, one end of which is attached to the frame of the machine and the other end of which is attached to the sliding block 118 which carries the above mentioned pawl 84 which engages the pressure block 83. Tension on the chain 117 is maintained by a spring 119. This chain and pulley linkage provides for the relatively long travel of the pressure block 83 required to reset the machine. The pivot pin 115 also operates a link 120 running to a bellcrank 121 which turns a second jack shaft 122 which has attached thereto a short bellcrank 123 for each column 11 of voting units in the machine. Pins on the bellcrank 123 operate slidably in goosenecks 124 on the ends of slide rods 125 extending through each voting column, giving said rods a reciprocating motion.

Referring now to FIGS. 19 and 3, a three digit mechanical counter 126 operated by a star wheel 127 is mounted along each voting unit in the column 12. Mounted along the slide rods 125 is a series of pawls 128, one for each counter. When a particular candidate is voted the cam surface 35 on the finger 32 of the key slide 27 moves under the pawl 128. Then when the voting lever 19 is pulled the pawl 128 rides up over the cam surface 33 and engages the star wheel 127 of the counter 126, registering one vote on that counter. Since, at the beginning of the return stroke of the lever 19, all the voting keys are cleared far enough for the cam surface 33 to miss the pawl 128, it does not engage the star wheel 127 on its return trip.

The last voting column 11 adjacent the punch card bank 93 is purposely used for questions involving only certain precincts, and the keys not to be voted in any one precinct can be blocked by means of pins 129, FIG. 16, set in a shaft 130 lying just under and parallel to the body 12. The sequence of the pins can be arranged to lock out certain keys in each precinct, or, as in some elections, when only registered tax payers are to vote on a proposition, the election official can turn the shaft 130 to block off the keys 25 as shown by the dotted outline of the pins 129 on ascertaining if the voter is eligible. The shaft 130 can be turned by the same key 23 that unlocks the voting machine, or by a special key, not shown.

Although the interacting mechanical sections of this invention may appear somewhat complicated, the end result is a greatly simplified voting machine from the standpoint of setting up for election, counting votes and use by the voter. A substantial reduction in cost and weight has been accomplished in relation to voting machines now in use, and the weight reduction alone is an important factor in the cost of elections as the machines have to be transported from official headquarters to the polling places and back again for each election. Reduced cost of storage is also important, this machines having but a fraction of the volume of machines now in use.

The invention is not limited to the exemplary construction herein shown and described, but may be made in various ways within the scope of the appended claims.

What is claimed is:

1. In a machine for recording operator selections having multiple keys, each key representing a different possible selection, apparatus for making a permanent record of the operator selections comprising:
   means for receiving a recording medium;
   marking means adjacent said receiving means including multiple marking members each having an active and an inactive state, said members in the active state being adapted to record the operator selections on the recording medium;
   means for interconnecting each of said selection keys with one of said marking members to orient in an active state each marking member corresponding to a selected key, said marking members being oriented independent of the orientation of any other said marking member; and
   means associating said marking means with said receiving means for registering operator selections by simultaneously recording on said recording medium the orientation of each marking member in the active state.

2. In a machine for recording operator selections having multiple keys, each key representing a different possible selection, apparatus for marking a record card with the operator selections comprising:
   means for receiving the card;
   marking means adjacent said card receiving means including multiple marking members each having an active and an inactive position, said members being adapted to impress the card in said active position;
   linkage means for interconnecting each of said selection keys with one of said marking members to place in an active position each marking member corresponding to a selected key, said marking members being positioned independent of the position of any other said marking member; and
   means associating said marking means with said receiving means for registering the operator's selection on said card, including means for moving said card and said marking means into mutual engagement so that active marking members impress said card in a pattern corresponding to the operator's selections.

3. The apparatus of claim 1 wherein said machine is a voting machine and wherein each key represents a different voter selection.

4. The apparatus of claim 2 wherein said linkage means interconnecting said keys and said marking means includes rod assembly means associated with said keys and actuable thereby to place said marking members to said active position.

5. In a machine having multiple selection keys, apparatus for registering operator selections comprising:
   means for receiving a record card;
   marking means adjacent said card receiving means including a plurality of punch members for perforating the card;
   mechanical linkage means interconnecting said keys and said marking means including first push rods reciprocably mounted and in controlling engagement with said punches, second push rods in intersecting alignment with said first push rods, and means associated with said keys for selectively moving said second rods to intercept and block the reciprocation of the corresponding first push rods to establish a mechanical pattern blocking said punches corresponding to said selections; and registering means for registering the selection, including means for moving said card and marking means into mutual engagement so that the blocked punches perforate said record card thereby transferring the pattern in its entirety simultaneously to the card.

6. A method of recording operator selections on a recording medium with a machine having multiple keys, each key representing a different possible selection and being associated with a marking member having an active and an inactive state, said members in the active state being adapted to record the operator selections on the recording medium, comprising:

inserting said recording medium into said machine;

manipulating said selection keys to orient in an active state each marking member corresponding to a selected key, said marking members being oriented independent of the orientation of any other said marking member; and registering operator selections by simultaneously recording on said recording medium the orientation of each marking member in the active state.

7. The method of claim 6 wherein said card is marked by punching.

8. A method of recording operator selections with a selection machine having multiple keys, each key representing a different possible selection and being associated with a marking member having an active and inactive position, said members in said active position being adapted to impress the card, comprising:

inserting a data processing card into said machine;

manipulating said selection keys to place in an active position each marking member corresponding to a selected key, said marking members being positioned independent of the position of any other said marking member; and registering the operator's selection on said card, including moving said card and said active marking members into mutual engagement to impress said card in a pattern corresponding to the operator's selections.

9. The method of permanently recording operator selections in a machine having multiple keys each representing a different selection, comprising:

inserting a data processing compatible card into said machine;

manipulating selected keys each corresponding to a selection to actuating a mechanical linkage locking a corresponding punch in a punching position, including moving preselected parallel traverse rods of successively increasing length into intercepting blocking engagement with longitudinal parallel rods of successively increasing lengths, said parallel rods being axially aligned with said punches to constrain the punches corresponding to the blocked parallel rods against axial movement; and registering said selections on the card by moving said card and punches into engagement so that the locked punches perforate the card in a pattern representing said selections.

* * * * *